United States Patent
Dall'Occo et al.

(10) Patent No.: US 7,202,315 B2
(45) Date of Patent: Apr. 10, 2007

(54) PROCESS FOR THE PREPARATION OF ETHYLENE POLYMERS

(75) Inventors: Tiziano Dall'Occo, Ferrara (IT); Andrew D. Horton, Amsterdam (NL); Bart J. Ruisch, Amsterdam (NL); Klaas L. von Hebel, Kortenhoef (NL); Arie van Zon, Amsterdam (NL); Henri H. Deuling, Amsterdam (NL); Eric J. M. de Boer, Amsterdam (NL)

(73) Assignee: Basell Polyolefine GmbH, Wesseling (DE)

( * ) Notice: Subject to any disclaimer, the term of this patent is extended or adjusted under 35 U.S.C. 154(b) by 204 days.

(21) Appl. No.: 10/381,401

(22) PCT Filed: Sep. 24, 2001

(86) PCT No.: PCT/EP01/11131

§ 371 (c)(1),
(2), (4) Date: Mar. 24, 2003

(87) PCT Pub. No.: WO02/24769

PCT Pub. Date: Mar. 28, 2002

(65) Prior Publication Data

US 2004/0097668 A1    May 20, 2004

(30) Foreign Application Priority Data

Sep. 25, 2000    (EP) .................... 00203330

(51) Int. Cl.
*C08F 4/76* (2006.01)
*C08F 4/52* (2006.01)
*C08F 110/02* (2006.01)

(52) U.S. Cl. .............. 526/161; 526/172; 526/352; 526/134; 526/153

(58) Field of Classification Search ............ 526/172, 526/161, 160, 170, 134, 126, 352
See application file for complete search history.

(56) References Cited

U.S. PATENT DOCUMENTS 5,726,115 A * 3/1998 Horton et al. .......... 502/152

6,255,419 B1 * 7/2001 Imuta et al. ............ 526/172
6,372,684 B1 * 4/2002 Horton et al. ........... 502/155
6,380,329 B1 * 4/2002 Jensen et al. ........... 526/127

FOREIGN PATENT DOCUMENTS

| EP | 575875 | 12/1993 |
|---|---|---|
| EP | 633272 | 1/1995 |
| EP | 893454 | 1/1999 |
| WO | 9212162 | 7/1992 |
| WO | 9526369 | 10/1995 |
| WO | 9602580 | 2/1996 |
| WO | 9627439 | 9/1996 |
| WO | 9921899 | 5/1999 |
| WO | 9952631 | 10/1999 |
| WO | 0121674 | 3/2001 |
| WO | 0162764 | 8/2001 |

OTHER PUBLICATIONS

Jaeger et al., Chem. Ber./Recueil, 1997, 130(3), 399-403.*
F. Jaeger et al., "Metallacyclodisiladiazanes of titanium and zirconium. Synthesis, structure, and Polymerization studies;" *Chemische Berichte/Recueil*; 130(3), p. 399-403 (1997).
A. Horton et al., "New highly active and selective ethylene oligomerization catalysts based on cationic diamide zirconium comlexes;" *Macromolecular Symposia* (2001), 173 (Conference on Insertion Polymerization, 2000), p. 123-136.
C. E. Wilkes et al., "Monomer Sequence Distribution in Ethylene-Propylene Terpolymers Measured by 13C Nuclear Magnetic Resonance;" *J. Polymer Sci.: Symposium* No. 43, p. 237-250 (1973).
J. C. Randall; "A Review of High Resolution Liquid $^{13}$Carbon Nuclear Magnetic Resonance Characterizations of Ethylene-Based Polymers;" *JMS-Rev. Macromol. Chem. Phys.*; C29 (2&3) p. 201-317 (1989).

* cited by examiner

*Primary Examiner*—Ling-Sui Choi
*Assistant Examiner*—Rip A. Lee
(74) *Attorney, Agent, or Firm*—Jarrod N Raphael; William R Reid

(57) ABSTRACT

A process for polymerizing ethylene comprising contacting under polymerization condition ethylene and optionally one or more olefins with a catalyst system obtainable by contacting: a bis amido compound of formula (I) wherein Y is Si, Ge and Sn; X is hydrogen, halogen or an hydrocarbon radical; $R^1$, $R^2$, $R^3$, $R^4$, $R^5$ and $R^6$, are hydrocarbon radical; Q is a neutral Lewis base; and m is 0–2; one or more boron activating cocatalysts and one or more aluminum alkyls or alumoxanes.

11 Claims, No Drawings

PROCESS FOR THE PREPARATION OF ETHYLENE POLYMERS

This application is the U.S. national phase of International Application PCT/EP01/11131, filed Sep. 24, 2001.

FIELD OF THE INVENTION

The present invention relates to a process for preparing ethylene homopolymers and copolymers by using a catalyst system comprising a bis amide titanium complex and a boron containing cocatalyst.

It is known that amido transition metal compounds are active as catalyst for polymerizing alpha-olefins. For example WO 92/12162 relates to bridged or unbridged amido transition metal compounds that together with an alumoxane are able to polymerize propylene and ethylene. Even if the general formula of this document encompasses bridged and unbridged amido complex of zirconiumn, titanium and hafnium, only unbridged complexes of zirconium and hafnium are exemplified.

WO 96/27439 relates to bridged bis-amido group IV metal compound, where the bridge contains two atoms of silicon, germanium or tin. These compounds are fit as catalyst component for producing ethylene oligomers when they are used in conjunction with a boron cocatalyst. Also in this case the general formula encompasses metal belonging to group IV of the periodic table, but only zirconium and hafnium complexes are used in the oligomerization examples.

In Chem. Ber./Recl. (1997), 130(3), 399–403, [1,2-bis(t-butylamide)tetramethyldisilane)] titanium dichloride, difluoride and dimethyl are prepared and tested in ethylene polymerization using methylalumoxane as cocatalyst. The polymers prepared are not characterized with the exception of the melting point.

The applicant has now found a novel process for (co) polymerizing ethylene, comprising contacting ethylene and optionally one or more olefins under polymerization conditions with a catalyst system obtainable by contacting a bridged disilane bis amido titanium complex and compounds having formula $U^+Z^-$, wherein $U^+$ is a cation able of reacting irreversibly with a substituent X of the compound of formula (I), and $Z^-$ is a compatible non-coordinating anion comprising at least one boron atom, or with a strongly neutral Lewis acidic compound comprising at least one boron atom;

Ethylene homopolymers obtained with said process show a long chain branch content higher than 0.05 per 1000 C atoms, preferably 0.1 per 1000 C atoms, more preferably 0.3 per 1000 C atoms, while on the contrary when alumoxanes are used as cocatalyst instead of a boron containing compound, the polymers substantially show a long chain branch content under the detectability in the used analytical conditions (lower than 0.03 per 1000 carbon atoms).

SUMMARY OF THE INVENTION

The present invention provides a process for homopolymerizing ethylene or copolymerizing ethylene and one or more olefins comprising contacting under polymerization condition ethylene and optionally one or more olefins with a catalyst system obtainable by contacting:

A) A Bis Amido Compound of Formula (I)

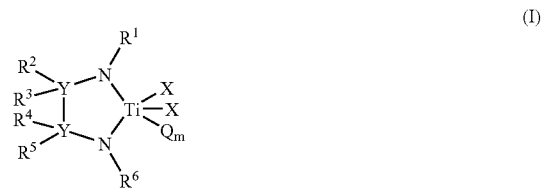

wherein
Ti is titanium;
N is a trivalent nitrogen atom;
the Y atoms, the same or different from each other, are selected from the group consisting of Si, Ge and Sn;
the X groups, the same or different from each other, are selected from the group consisting of hydrogen, halogen, linear or branched, saturated or unsaturated $C_1$–$C_{20}$ alkyl $C_1$–$C_{20}$ alkoxyl, $C_3$–$C_{20}$ cycloalkyl, $C_6$–$C_{20}$ aryl, $C_6$–$C_{20}$ aryloxyl, $C_7$–$C_{20}$ alkylaryl and $C_7$–$C_{20}$ arylalkyl radicals, optionally containing one or more Si, Ge, O, S, P, B or N atoms; or two X groups form a ring having from 4 to 8 members;
$R^1$, $R^2$, $R^3$, $R^4$, $R^5$ and $R^6$, equal to or different from each other, are selected from the group consisting of hydrogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more Si, Ge, O, S, P, B or N atoms; or are $Si(R^7)_3$ groups, wherein the groups $R^7$, the same or different from each other, are linear or branched, saturated or unsaturated $C_1$–$C_{10}$ alkyl, $C_3$–$C_{10}$ cycloalkyl, $C_6$–$C_{15}$ aryl, $C_7$–$C_{15}$ alkylaryl or $C_7$–$C_{15}$ arylalkyl groups; or two or four substituents of $R^1$, $R^2$, $R^3$, $R^4$, $R^5$ and $R^6$, form one or two rings having from 4 to 8 members;
Q is a neutral Lewis base; and
m is an integer having values 0, 1 or 2;
said bis-amido compound being optionally present in the form of a dimer,
B) one or more activating cocatalysts selected from compounds having formula $U^+Z^-$, wherein $U^+$ is a cation able of reacting irreversibly with a substituent X of the compound of formula (I), and $Z^-$ is a compatible non-coordinating anion comprising at least one boron atom; and strongly neutral Lewis acidic compounds comprising at least one boron atom; and when in the compound of formula (I) X is halogen
C) one or more aluminum alkyls or alumoxanes;
In the bis-amido compounds of formula (I) the Y atoms are preferably the same, and are more preferably two Si atoms;
the groups X are preferably selected from hydrogen, halogen, methyl, ethyl, propyl, n-butyl, phenyl, 4-alkyl-phenyl and benzyl groups; two X groups can form, together with the titanium atom, a ring having from 4 to 8 members, and preferably a titanacyclobutane; more preferably X are selected from halogen, methyl and benzyl groups;
$R^1$, $R^2$, $R^3$, $R^4$, $R^5$ and $R^6$, equal to or different from each other, are preferably methyl, ethyl, propyl, n-butyl, t-butyl, t-amyl, cyclohexyl, phenyl, dimethyl-phenyl, diisopropyl-phenyl, trimethylsilyl, tri-t-butyl-silyl, phenylmethyl-ethyl, diphenyl-ethyl and triphenyl-methyl; more preferably $R^2$, $R^3$, $R^4$, $R^5$ are methyl groups;

R¹ and R⁶ are t-butyl groups; preferred examples of the neutral Lewis base Q are diethylether, tetrahydrofuran, dimethylaniline, aniline, n-butylamine and trimethylphosphine.

Preferred bis-amido compounds of formula (I) according to the present invention are:
{1,2-bis(t-butylamide)-tetramethyldisilane}titanium dibenzyl {(Me₂SiNCMe₃)₂}Ti (CH₂Ph)₂
{1,2-bis(t-butylamide)-tetramethyldisilane}titanium dichloride {(Me₂SiNCMe₃)₂}TiCl₂
{1,2-bis(t-butylamide)-tetramethyldisilane}titanium dimethyl, {(Me₂SiNCMe3)₂}TiMe₂
{1,2-bis(t-butylamide)-tetramethyldisilane}titanium di(n-butyl), {(Me₂SiNCMe₃)₂}Ti(n-Bu)₂
{1,2-bis(t-butylamide)-tetramethyldisilane}titanium diphenyl, {(Me₂SiNCMe₃)₂}TiPh₂
{1,2-bis(t-butylamide)-tetramethyldisilane}titanium di(4-methylphenyl), {(Me₂SiNCMe₃)₂}Ti{CH₂(4Me-Ph)}₂
{1,2-bis(t-butylamide)-tetramethyldisilane}titaniumcyclobutane, {(Me₂SiNCMe₃)₂}{TiCH₂CH₂CH₂}
{1,2-bis(t-butylamide)-tetramethyldisilane}titanium dihydride, {(Me₂SiNCMe₃)₂}TiH₂
{1,2-bis(t-amylamide)-tetramethyldisilane}titanium dibenzyl, {(Me₂SiNCMe₂Et)₂}Ti(CH₂Ph)₂
{1,2-bis(t-amylamide)-tetramethyldisilane}titanium dichloride, {(Me₂SiNCMe₂Et)₂}TiCi₂
{1,2-bis(cyclohexylamide)-tetramethyldisilane}titanium dibenzyl, {(Me₂SiNCy)₂}Ti(CH₂Ph)₂
{1,2-bis(cyclohexylamide)-tetramethyldisilane}titanium dichloride, {(Me₂SiNCy)₂}TiCl₂
{1,2-bis(ethylamide)-tetramethyldisilane}titanium dibenzyl, {(Me₂SiNEt)₂}Ti(CH₂Ph)₂
{1,2-bis(ethylamide)-tetramethyldisilane}titanium dichloride, {(Me₂SiNEt)₂}TiCl₂
{1,2-bis(phenylamide)-tetramethyldisilane}titanium dibenzyl, {(Me₂SiNPh)₂}Ti(CH₂Ph)₂
{1,2-bis(phenylamide)-tetramethyldisilane}titanium dichloride, {(Me₂SiNPh)₂}TiCl₂
{1,2-bis(2,6-dimethylphenylamide)-tetramethyldisilane}titanium dibenzyl, {(Me₂SiN[2,6-Me₂-Ph])₂}Ti(CH₂Ph)₂
{1,2-bis(2,6-dimethylphenylamide)-tetramethyldisilane}titanium dichloride, {(Me₂SiN[2,6-Me₂-Ph])₂}TiCl₂
{1,2-bis(trimethylsilylamide)-tetramethyldisilane}titanium dibenzyl, {(Me₂SiNSiMe₃)₂}Ti(CH₂Ph)₂
{1,2-bis(trimethylsilylamide)-tetramethyldisilane}titanium dichloride, {(Me₂SiNSiMe₃)₂}TiCl₂
{1,2-bis(tri(t-butyl)silylamide)-tetramethyldisilane}titanium dibenzyl, [{(Me₂SiNSi(CMe₃)₃}₂]Ti(CH₂Ph)₂
{1,2-bis(tri(t-butyl)silylamide)-tetramethyldisilane}titanium dichloride, [{(Me₂SiNSi(CMe₃)₃}₂]TiCi₂
{1,2-bis(t-butylamide)-tetraethyldisilane}titanium dibenzyl, {(Et₂SiNCMe₃)₂}Ti(CH₂Ph)₂
{1,2-bis(t-butylamide)-tetraethyldisilane}titanium dichloride, {(Et₂SiNCMe₃)₂}TiCl₂
{1,2-bis(t-butylamide)-tetraethyldisilane}titanium dimethyl, {(Et₂SiNCMe₃)₂}TiMe₂
{1,2-bis(t-butylamide)-tetraphenyldisilane}titanium dibenzyl, {(Ph₂SiNCMe₃)₂}Ti(CH₂Ph)₂
{1,2-bis(t-butylamide)-tetraphenyldisilane}titanium dichloride, {(Ph₂SiNCMe₃)₂}TiCi₂
{1,2-bis(t-butylamide)-tetramethyldigermane}titanium dibenzyl, {(Me₂GeNCMe₃)₂}Ti(CH₂Ph)₂
{1,2-bis(t-butylamide)-tetramethyldigermane}titanium dichloride, {Me₂GeNCMe₃)₂}TiCl₂
{1,2-bis(t-butylamide)-tetramethyldistannane}titanium dibenzyl, {(Me₂SnNCMe₃)₂}Ti(CH₂Ph)₂,
{1,2-bis(t-butylamide)-tetramethyldistannane}titanium dichloride, {Me₂SnNCMe₃)₂}TiCl₂
{1,2-bis(1,1,3,3-tetramethylbutylamide)-tetramethyldisilane}titanium dibenzyl, {(Me₂SiNCMe₂CH₂CMe₃)₂}Ti(CH₂Ph)₂,
{1,2-bis(1,1,3,3-tetramethylbutylamide)-tetramethyldisilane}titanium dichloride, {(Me₂SiNCMe₂CH₂CMe₃)₂}TiCl₂,
{1,2-bis(2,6-diisopropylphenylamide)-tetramethyldisilane}titanium dibenzyl, {(Me₂SiN[2,6-iPr₂Ph])₂}Ti(CH₂Ph)₂, and
{1,2-bis(2,6-diisopropylphenylamide)-tetramethyldisilane}titanium dichloride, {(Me₂SiN[2,6-iPr₂Ph])₂}TiCl₂.

The bis-amido compounds of formula (I) can be prepared according to procedures known in the state of the art, and more specifically as described in Chem. Ber./Recl. (1997), 130(3), 399–403 and WO 96/27439.

Said bis-amido compounds can be in the form of a dimer, corresponding to the following formula (II):

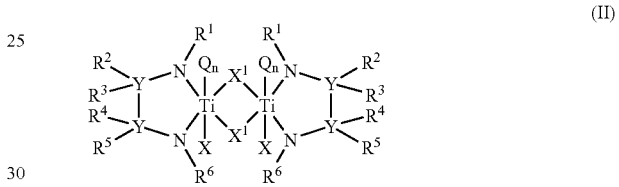

(II)

wherein Y, X, R¹, R², R³, R⁴, R⁵, R⁶ and Q have the meaning reported above X¹ is a divalent radical selected from the group consisting of: linear or branched, saturated or unsaturated C₁–C₂₀ alkylidene, C₃–C₂₀ cycloalkylidene, C₆–C₂₀ arylidene, C₇–C₂₀ alkylarylidene or C₇–C₂₀ arylalkyldene radicals, optionally containing one or more Si, Ge, O, S, P, B or N atoms; and n is 0 or 1.

The catalyst systems of the process of the present invention further comprise one or more activating cocatalysts (component B) of formula U⁺Z⁻, wherein U⁺ is a cation able of reacting irreversibly with a substituent X of the compound of formula (I) or (II), and Z⁻ is a bulky and labile anion, substantially non-coordinating under the reaction conditions, and containing at least one boron atom. Further suitable activating cocatalysts are neutral Lewis acidic compounds, containing at least one boron atom, which are capable of abstracting one of the radicals X of the first component, thereby also contributing an anion Z⁻. Said anion must be capable of stabilizing the active catalytic species originating by the reaction of the compound (I) or (II) with said activating cocatalyst and must be sufficiently labile to be able to be displaced by an olefinic substrate.

Components A) and B) form together an ionic compound of formula (III):

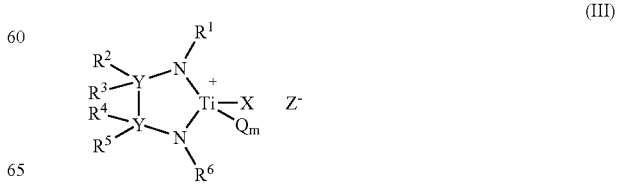

(III)

wherein Y, X, R¹, R², R³, R⁴, R⁵, R⁶, Q, Z⁻ and m have the meaning reported above; or, when the component A) is in the form of the above reported dimer (II), an ionic compound of formula (IV):

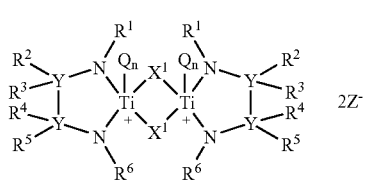

(IV)

wherein Y, X, X¹, R¹, R², R³, R⁴, R⁵, R⁶, Q, Z⁻ and n have the meaning reported above. In component (B), U⁺ is preferably a Broensted acid, capable of donating a proton and of reacting irreversibly with a substituent X of the compound of formula (I) or (II); the cation U⁺ is preferably a quaternary ammonium cation, and more preferably a trihydrocarbyl ammonium cation of formula $N(R^{10})_3H^+$ wherein $R^{10}$, equal to or different from each other, is selected from the group consisting of linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more Si, Ge, O, S, P, or B atom, such as tri-n-butylammonium and dimethylanilinium.

Alternatively U⁺ is a non proton-donating cation, in particular a metal cation, such as a silver ion or a triphenyl carbenium ion.

In component (B), the anion Z⁻, containing one boron atom, is preferably a borate of formula $[B(R^8)_4]^-$, wherein R⁸ is selected from the group consisting of hydrogen, $C_1$–$C_{10}$ alkyl, $C_3$–$C_{10}$ cycloalkyl, $C_6$–$C_{15}$ aryl, $C_7$–$C_{15}$ alkylaryl and $C_7$–$C_{15}$ arylalkyl groups, optionally substituted with one or more halogens; suitable examples are $[B(C_6F_5)_4]^-$, $[R^8B(C_6F_5)_3]^-$, $[B(FC_6H_4)_4]^-$, $[R^8B(FC_6H_4)_3]^-$, $[B\{(CF_3)_2(C_6H_3)\}_4]^-$ and $[R^8B\{(CF_3)_2(C_6H_3)\}_3]^-$, wherein R⁸ has the meaning reported above. Alternatively the anion Z⁻ can contain a plurality of boron atoms such as carborates, for example $[B_{11}CH_{12}]^-$.

The activating cocatalyst U⁺Z⁻ can be also in the form of zwitterionic compounds such as the compound described in PCT/EP01/01467 wherein the compound U⁺Z⁻ has formula $(R^8)_3BP$ wherein P is a substituted or unsubstituted pyrrole.

The activating cocatalyst U⁺Z⁻ is preferably selected from the group consisting of:
dimethylanilinium tetrakis(pentafluorophenyl)borate [PhMe₂NH][B(C₆F₅)₄],
tri(n-butyl)ammonium tetrakis(pentafluorophenyl)borate [Bu₃NH][B(C₆F₅)₄],
dimethylanilinium tetrakis(2,3,5,6-tetrafluorophenyl)borate [PhMe₂NH][B(2,3,5,6–C₆F₄H)₄],
dimethylanilinium tetrakis(3,5-bis-trifluoromethyl-phenyl) borate [PhMe₂NH ][B(3,5-(CF₃)₂—C₆H₃)₄],
dimethylanilinium tetrakis(4-fluorophenyl)borate [PhMe₂NH[]B(4—C₆H₄F)₄],
dimethylanilinium tetraphenylborate [PhMe₂NH][B(C₆H₅)₄],
triphenylcarbonium tetrakis(pentafluorophenyl)borate [Ph₃C][B(C₆F₅)₄],
ferrocenium tetrakis(pentafluorophenyl)borate [(C₅H₅)₂Fe][B(C₆F₅)₄],
silver tetrakis(pentafluorophenyl)borate [Ag][B(C₆F₅)₄],
tri(n-butyl)ammonium 1-carbodecaborate [Bu₃NH][CB₁₁H₁₂] and diethyloxonium tetrakis(3,5-bis-trifluoromethyl-phenyl)borate [H(OEt₂)₂][B(3,5-(CF₃)₂—C₆H₃)₄].

When component (B) is a neutral strongly Lewis acidic compound, it has preferably formula $(R^8)_3B$, wherein R⁸ has the above reported meaning, more preferably it is selected from the group consisting of:
tris(pentafluorophenyl)borane B(C₆F₅)₃,
tris(2,3,5,6-tetrafluorophenyl)borane B(2,3,5,6–C₆F₄H)₃, and
trimethylboron B(CH₃)₃.

The boron containing components (B) of the catalyst systems of the invention can be prepared according to procedures known in the state of the art, and in particular as described in the international patent application WO 96/27439.

When X is halogen the component (C) is used as alkylating agent. For obtaining better results in the process of the present invention component (C) can be also used when X is different from halogen, for the reason that it acts as scavenger for removing polymerization poisons.

Aluminum alkyls useful as component (C) may be compound of formula $H_xAlR^9_{3-x}$ or $H_yAl_2R^9_{6-y}$, wherein x and y are numbers ranging from 0 to 1 both x and y can be non-integer numbers and R⁹, equal to or different from each other, is selected from the group consisting of halogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, preferably R⁹ is selected from the group consisting of branched, saturated or unsaturated $C_1$–$C_{20}$ alkyl or $C_7$–$C_{20}$ alkylaryl. Mixtures of different aluminum alkyls can also be used.

Not limiting examples of aluminum compounds of formula $H_xAlR^9_{3-x}$ or $H_yAl_2R^9_{6-y}$ are:
tris(methyl)aluminum, tris(isobutyl)aluminum, methyl-bis(isobutyl)aluminum,
dimethyl(isobutyl)aluminum, tris(isohexyl)aluminum, tris(benzyl)aluminum,
tris(tolyl)aluminum, tris(2,4,4-trimethylpentyl)aluminum,
bis(2,4,4-trimethylpentyl)aluminum hydride, isobutyl-bis(2-phenyl-propyl)aluminum,
diisobutyl-(2-phenyl-propyl)aluminum, isobutyl-bis(2,4,4-trimethyl-pentyl)aluminum,
diisobutyl-(2,4,4-trimethyl-pentyl)aluminum, tris(2,3-dimethyl-hexyl)aluminum,
tris(2,3,3-trimethyl-butyl)aluminum, tris(2,3-dimethyl-butyl)aluminum,
tris(2,3-dimethyl-pentyl)aluminum, tris(2-methyl-3-ethyl-pentyl)aluminum,
tris(2-ethyl-3-methyl-butyl)aluminum, tris(2-ethyl-3-methyl-pentyl)aluminum,
tris(2-isopropyl-3-methyl-butyl)aluminum, tris(2,4dimethyl-heptyl)aluminum.
tris(2-phenyl-propyl)aluminum, tris(2-(4-fluoro-phenyl)-propyl)aluminum and
tris(2-(4-chloro-phenyl)-propyl)aluminum as well as the corresponding compounds where one or more of the hydrocarbyl groups is replaced by a hydrogen atom. Particularly preferred aluminum compounds are
trimethylaluminum (TMA), tris(2,4,4-trimethylpentyl) aluminum (TIOA),
triisobutylaluminum (TIBA), tris(2,3,3-trimethyl-butyl)aluminum, tris(2,3-dimethyl-butyl)aluminum, tris(2-phenyl-propyl) aluminum, tris[2-(4-fluoro-phenyl)-propyl]aluminum and tris[2-(4-chloro-phenyl)-propyl]aluminum.

Alumoxane useful as component (C) may be linear alumoxanes of the formula (V):

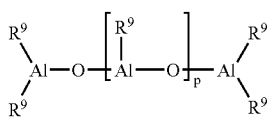

wherein $R^9$ has the meaning given above and p ranges from 0 to 40; or cyclic alumoxanes of the formula (VI):

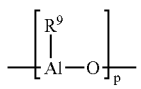

wherein $R^9$ has the meaning herein described and p is an integer ranging from 3 to 40. The above alumoxanes may be obtained according to procedures known in the state of the art, by reacting water with an organo-aluminum compound of formula $H_xAlR^9_{3-x}$ or $H_yAl_2R^9_{6-y}$, with the condition that at least one $R^9$ is not halogen. In this case, the molar ratios of Al/water in the reaction is comprised between 1:1 and 100:1. Particularly suitable are the organometallic aluminum compounds described in formula (II) of EP 0 575 875 and those described in formula (II) of WO 96/02580. Moreover, suitable cocatalysts are those described in WO 99/21899 and in the European app. no. 99203110.4.

The molar ratio between aluminum and the metal of the titanium complex is comprised between about 10:1 and about 10000:1, preferably between about 20:1 and about 5000:1, more preferably between 20:1 and about 1000:1.

Examples of alumoxanes suitable as component (C) in the process of the invention are methylalumoxane (MAO), tetra-isobutyl-alumoxane (TIBAO), tetra-2,4,4-trimethyl-pentyl-alumoxane (TIOAO), tetra-2-methyl-pentylalumoxane and tetra-2,3-dimethyl-butylalumoxane. Mixtures of different alumoxanes can also be used.

The components (A), (B) and optionally (C) of the catalyst system according to the present invention can be brought into contact in different manners. The catalyst system may be formed by mixing together components (A), (B) and (C), following different orders of addition, preferably in solution, in a suitable non-polar solvent such as toluene, benzene, chlorobenzene, an alkane or an alkene, to form a liquid catalyst system. A preferred way of forming the catalyst system of the invention comprises first mixing components (A) and (C), and subsequently adding to the obtained mixture a solution of component (B), preferably in toluene.

The catalyst system may be formed prior to its introduction into the reaction vessel, or it may be formed in situ.

Components (A) and (B) are preferably employed with a molar ratio ranging from 0.1:1 to 5:1, and more preferably ranging from 0.2:1 to 1.1:1.

The molar ratio between the aluminium of component (C) and the metal M of the bis-amido compound (A) preferably ranges from 10:1 to 10000:1, more preferably from 20:1 to 5000:1, and even more preferably from 20:1 to 1,000:1.

The catalysts of the present invention can also be used on inert supports. This is achieved by depositing the components (A), (B) and/or (C), either singly or in mixture, on an inert support such as silica, alumina, silica/alumina, titania, zirconia, magnesia; suitable inert supports are olefin polymers or prepolymers, such as polyethylenes, polypropylenes, (porous prepolymers described in International application WO 95/26369.) or styrene/divinylbenzene copolymers, supports of this type are described in European application EP-A-0 633272.

The thus obtained supported catalyst systems can be advantageously used in gas-phase polymerization.

The process for the polymerization of olefins according to the invention can be carried out in the liquid phase in the presence or absence of an inert hydrocarbon solvent, or in the gas phase. The hydrocarbon solvent can either be aromatic such as toluene, or aliphatic such as propane, hexane, heptane, isobutane or cyclohexane.

The polymerization temperature is generally comprised between $-100°$ C. and $+200°$ C. and, particularly between $10°$ C. and $+90°$ C. The polymerization pressure is generally comprised between 0.5 and 100 bar. The lower the polymerization temperature, the higher are the resulting molecular weights of the polymers obtained.

The process of the present invention allows to produce ethylene homopolymer and ethylene olefins copolymer. Ethylene homopolymers obtainable by the process of the present invention show a long chain branch content higher than 0.05 per 1000 C atoms together with low melting point and acceptable molecular weight and a narrow molecular weight distribution as determined by Size Exclusion Chromatography (SEC), but a broad molecular weight distribution as determined by shear sensitivity. In fact the melt Index ratio ($MI_{21.6}/MI_{2.16}$ at $190°$ C.) shows values higher than 50 at a value of $MI_{2.16}$ of about 0.54.

A further object of the present invention is an ethylene olefins copolymer having an unsaturation per polymer chain.

The usual chain termination reaction in an ethylene polymers, in the absence of hydrogen, provide the formation of unsaturated polymer chain of different types, the most important are:

1) vinyl end groups, after an ethylene insertion in the Metal—growing chain bond;
2) vinylidene end groups, after a 1,2-olefin insertion in the Metal—growing chain bond;
3) internal double bonds, after a 2,1-olefin insertion in the Metal—growing chain bond;

According to the following scheme wherein W represents an hydrocarbon group of the comonomer:

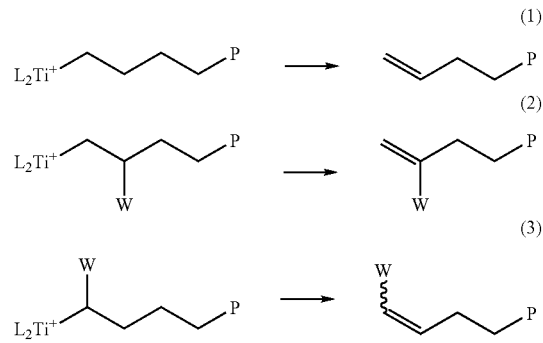

In the ethylene homopolymerization with the said process the main termination reaction is of the type 1).

When said process is used for obtaining ethylene copolymers, by reacting ethylene with an alpha-olefin, the product is characterized by having 3) as the main termination reaction in which W depends on the type of alpha-olefin used and P represent the polymer chain.

Therefore a further object of the present invention is a copolymer of ethylene and an alpha-olefin having from 4 to 20 carbon atoms, characterized in that at least 80%, preferably 85% and more preferably 90% of the polymer chains are terminated with the following structure:

wherein W represents an-hydrocarbon group of general formula $C_{v-f}H_{2(v-f)+1}$, wherein v is the number of carbon atoms of the comonomer and f is 2 or 3; for example if the olefin is 1-hexene W is a $C_3H_7$ or $C_4H_9$ radical; and P represent the polymer chain.

Non limiting examples of alpha olefins are 1-butene, 1-pentene, 1-hexene, 4-methyl-1-pentene, 4,6-dimethyl-1-heptene, 1-octene, 1-decene, 1-dodecene, 1-tetradecene, 1-hexadecene, 1-octadecene and allylcyclohexane.

Olefins that can be used with the process of the present invention for copolymerizing ethylene are all the olefins that can be polymerized in particular they are alpha olefins such as 1-butene, 1-pentene, 1-hexene, 4methyl-1-pentene, 4,6-dimethyl-l-heptene, 1-octene, 1-decene, 1-dodecene, 1tetradecene, 1-hexadecene, 1-octadecene and allylcyclohexane; cycloolefins such as cyclopentene, cyclohexene, norbornene, and conjugated or non-conjugated dienes such as 1,4-hexadiene, isoprene, 1,3-butadiene, 1,5-hexadiene, 1,6-heptadienes 6-methyl-1,5-heptadiene, 3,7-dimethyl-1,6-octadiene, 11-methyl-1,10-dodecadiene and 5-Ethylidene-2-norbornene.

With the process of the present invention can be prepared also terpolymer of ethylene, such as ethylene/propylene/non conjugated dienes terpolymer.

The double bonds present in the copolymer chain allow to functionalize the copolymer with suitable groups in order to enhance the compatibility with polar polymers, fibers or filler. Example of functional groups are anhydrides, esters, amides, carboxylic acids, silanes, boranes, alcohols, thiols, etc.

The polyethylene of the present invention can be crosslinked either by electron beam irradiation or with chemical reagents. The polyethylene of the present invention are suitable for various kinds of applications, such as insulated wire and other electric parts, printed circuit boards, heat insulating materials, packaging materials and roofing materials, by introduction of functional groups by chemical means into the hydrocarbon structure for further advanced applications.

The following experimental examples are reported for illustrative and non-limiting purposes.

GENERAL PROCEDURES AND CHARACTERIZATIONS

All the operations with the catalyst systems and the catalyst components (A)–(C) were carried out under nitrogen atmosphere by using conventional Schlenk-line techniques.

Solvent, such as hexane, heptane and toluene, were used after drying over molecular sieve, deoxygenated and distilled over $LiAlH_4$ or aluminum ti-isobutyl and stored under nitrogen.

NMR Characterization

The $^{13}C$-NMR and $^1H$-NMR analyses of the polymers were carried out on a Bruker DPX 400 spectrometer operating at 400.13 MHz and 100.61 MHz respectively and were analyzed at 120° C. The powder polymer samples were dissolved in 1,1,2,2-tetrachloro-1,2-dideuteroethane ($C_2D_2Cl4$) to give an 8% (wt./vol.) concentration. The residual peak of $C_2DHCl_4$ in $^1H$ spectra ($\delta$=5.95 ppm) and the peak of $S_{\delta\delta}$ (mononuclear according to Carman) carbon ($\delta$=29.9 ppm) in $^{13}C$ spectra were used as references. Proton spectra were acquired with a 45° pulse and 5 seconds of delay between pulses; 128 transients were stored for each spectrum. The carbon spectra were acquired with a 90° pulse and 15 seconds of delay between pulses. About 15000 transients were stored for each spectrum. The assignments of $^{13}C$-NMR spectra are given in scheme 1 (nomenclature according to C. J. Carman, R. A. Harrington, J. Polym. Sci.: Symposium, 43, 237 (1973)) and the assignments were made according J. C. Randall (JMS-Rev.Macromol.Chem.Phys., C29, 201 (1989)).

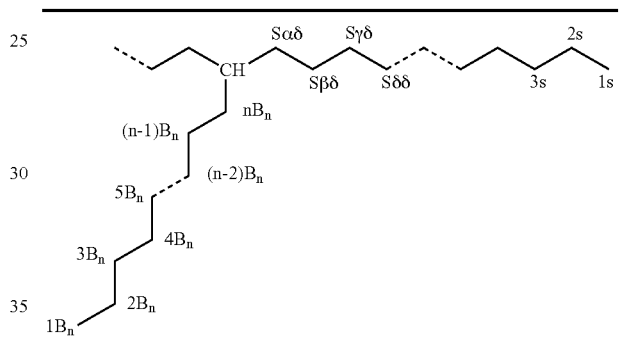

Scheme 1 - Ethylene/1-tetradecene copolymers were used as models for long chain branches.

| Carbon Type | Ethylene/1-hexene ppm | Ethylene/1-tetradecene ppm |
|---|---|---|
| $1B_n$ | 14.17 | 14.10 |
| $2B_n$ | 23.33 | 22.80 |
| $3B_n$ | 29.48 | 32.13 |
| $4B_n$ | 34.11 | 29.50 |
| $5B_n$ | — | 29.85 |
| $6B_n$ | — | 29.9 e |
| $7B_n$ | — | 29.9 e |
| $8B_n$ | — | 29.9 e |
| $9B_n$ | — | 29.9 e |
| $10B_n$ | — | 30.37 |
| $11B_n$ | — | 27.18 |
| $12B_n$ | — | 34.46 |
| CH | 38.09 | 38.11 |
| $S_{\alpha\delta}$ | 34.49 | 34.49 |
| $S_{\beta\delta}$ | 27.20 | 27.20 |
| $S_{\gamma\delta}$ | 30.38 | 30.39 |
| $S_{\delta\delta}$ | 29.90 | 29.90 |

For HDPE, the long chain branch (LCB/1000C) calculation was performed according to the following equation $$\text{Branches per 1000 carbons} = ((1/3)I_{(S\alpha\delta)}/I_{tot}) \cdot 10^3$$

In the copolymers with 1-hexene the presence of long chain branches, is established from the peaks of the unsaturated chain ends derived from the termination after 2,1-insertion of the LCB (assignment from comparison with ethylene/1-tetradecene copolymer) Assignments of unsaturated chain ends

| Type | 13C-NMR double bond region ppm | | α-CH$_2$ ppm | | 1H-NMR ppm | |
| --- | --- | --- | --- | --- | --- | --- |
| ⟋⟍⟋⟍P | CH$_2$<br>CH | 114.29<br>139.45 | CH$_2$<br>CH | | m<br>m | 4.9–5.1<br>5.8–5.9 |
| ⟋⟍⟋P (R) | | | CH$_2$ | | s | 4.72 |
| Cn∼∼⟍⟋⟍P | trans<br>cis | 130.66<br>130.23 | trans<br>cis | 32.71 CH<br>27.56 | m | 5.3–5.5 |
| C$_3$∼∼⟍⟋⟍P | cis/trans<br>"<br>" | 130.91<br>130.69<br>130.60 | CH | | m | 5.3–5.5 |
| C$_4$∼∼⟍⟋⟍P | "<br>"<br>"<br>"<br>" | 130.48<br>130.34<br>130.27<br>130.18<br>129.41 | CH | | m | 5.3–5.5 | m = multiplet, s = singlet

Molecular Weight Characterization

Intrinsic Viscosity

The determinations were carried out in a tetrahydronaphtalene (THN) solution obtained by dissolving the polymer at 135° C. for 1 hour.

Gel Permeation Chromatography (GPC) Analysis (Examples 10–15, 23–24)

High-temperature GPC analyses were carried out using a Waters 150 CV instrument. A single solution of each sample was prepared by adding 15 ml of solvent to ca. 30 mg of sample and refluxing gently for 20 minutes. The solutions were then filtered through a fibre pad at 140° C. and part of each filtered solution transferred into special glass sample vials. The vials were then placed in a heated sample compartment and after an initial delay of 20 minutes to allow the samples to equilibrate thermally, injection of part of the contents of each vial was carried out automatically in series.

The following chromatagraphic conditions were used:

| | |
| --- | --- |
| Column: | PLgel 2 x mixed bed-B, 30 cm, 10 microns |
| Solvent: | 1,2-dichlorobenzene with antioxidant |
| Flow rate: | 1.0 ml/minutes |
| Temperature: | 140° C. |
| Detector: | refractive index |
| Calibration: | polystyrene |

Thermal Analysis

The melting points of the polymers (Tm) were measured by Differential Scanning Calorimetry (D.S.C.) on an instrument DSC Mettler, according to the following method. About 10 mg of a sample obtained from the polymerization was heated at 200° C. with a scanning speed corresponding to 20° C. minute. The sample was kept at 200° C. for 5 minutes and thereafter cooled to −20° C. with a scanning speed corresponding to 20° C./minute, the peak temperature was assumed as crystallisation temperature (Tc). After standing 5 minutes at 0° C., the sample was heated to 200° C. at a rate of 10° C./min. In this second heating run, the peak temperature was assumed as melting temperature (Tm) and the area as global melting hentalpy ($\Delta H_f$).

Rheological Characterization

The rheological characterization was performed by using a plate-plate rheometer "Rheometrics RMS800" with 25 mm parallel plates (for thermal stability, dynamic mechanical analysis) and a test with a capillary rheometer (melt strength test).

The thermal stability test was performed according to the ISO 6721-10 standard ("Plastics-determination of the mechanical properties. Part 10:complex shear viscosity using a parallel plate oscillatory rheometer ") as a time sweep determination. The following conditions were used; T=190° C., strain 10%, frequency 1 rad/s, gap 2 mm, Test duration: 1 hour (3600 s).

The dynamic mechanical test was performed according to the method ISO 6721-10 as a frequency sweep determination under the following conditions; T=170° C., 180° C., 190° C., strain from 60% to 10% (decreasing during the test), frequency from 0.01 rad/s to 100 rad/s, gap 2 mm.

Maximum Duration Test.

Is the time for which testing can continue before the degradation of the sample having a significant effect on the results. The duration of thermal stability is defined, by the standard, as the time taken from the start of the test to that at which any of the measured values of G' (elastic modulus) [Pa], G" (loss modulus) [Pa] or complex viscosity [Pa*s] have changed from the initial value by ±5%. The maximum test duration being defined as 3600 s. All the components measured in the tests are increasing during time but they are below the upper limit of 5%.

Flow Activation Energy, Ea

The flow activation energy Ea, defined as the minimum of energy necessary to induce melt flow, was determined through a dynamic mechanical test at three different temperature (170, 180 and 190° C.). Tests have been run to determine the polymer melt response as a function of the frequency, that is known to be linked to the molecular structure. That parameter at constant torque was used to generate Arrhenius plots and the result of the calculation is reported in Table 4.

Melt Index:

Melt index (M.I.) are measured at 190° C. following ASTM D-1238 over a load of:

| 2.16 Kg, | MIE = $MI_{2.16}$. |
|---|---|
| 21.6 Kg, | MIF = $MI_{21.6}$. |

The ratio: F/E=MI F/MI E=$MI_{21.6}/MI_{2.16}$ is then defined as melt flow ratio (MFR)

Density:

Density was determined on the homogenized polymers (from the Melt Index determination) by using a gradient column and following the ASTM D-1505 procedure.

CATALYST COMPONENTS

Component (A):

{1,2-bis(t-butylamide)tetramethyl-disilane}-zirconium dichloride (compound 1)

{1,2-bis(t-butylamide)tetramethyl-disilane}-zirconium dichloride was prepared as described in international patent application WO 96/27439 (Example 1.2.1).

{1,2-bis(t-butylamide)tetramethyl-disilane}-zirconium dibenzyl (compound 2)

{1,2-bis(t-butylamide)tetramethyldisilane}-zirconium dibenzyl was prepared as described in the international patent application WO 96/27439 (Example 1.2.1 ).

{1,2-bis(t-butylamide)tetramethyl-disilane}-titanium dichloride (compound 3)

To a solution of $(Me_2SiNHCMe_3)_2$ (14.0 g, 54 mmol) in THF (400 ml) was added 46 ml of a 2.5 M solution of n-BuLi in hexane (115 mmol). The reaction mixture was stirred for 45 min giving a yellow solution of $(Me_2SiNLiCMe_3)_2$.

A solution of $TiCl_4$ (10.2 g, 54 mmol) in 80 ml toluene was added to 550 ml THF at −78° C., resulting in a yellow suspension of $TiCl_4.2THF$ in THF/toluene. To this vigorously stirred suspension, the solution of $(Me_2SiNLiCMe_3)_2$ was added at −78° C., giving a black suspension. The reaction was allowed to warm slowly to room temperature and stirred for 16 h. The solvent was removed under vacuum. Toluene (1 L) was added and, after stirring for 1 h, the solids were removed by filtration. The solvent was removed under vacuum and hexane (400 ml) was added to the residue. After stirring for 1 h the solids were removed by filtration. Yellow crystalline $(Me_2SiNCMe_3)_2TiCl_2$ (2.8 g, 7.4 mmol) was obtained on cooling the hexane solution to −30° C., separation of the crystals by filtration, washing with hexane and drying under vacuum.

{1,2-bis(t-butylamide)tetramethyl-disilane}-titanium dibenzyl (compound 4)

To a cooled (−78° C.) solution of $(Me_2SiNCMe_3)_2TiCl_2$ (2.0 g, 5.30 mmol) in ether (120 ml). was added 10.8 ml of a 1 M solution of MgBzCl in ether (10.8 mmol). The mixture was allowed to warm to room temperature and stirred for 45 min. Solids were removed by filtration, ether was removed under vacuum. Hexane (20 ml) was added to the residue and insoluble material removed by filtration. Red crystalline $(Me_2SiNCMe_3)_2TiBz_2$ (0.9 g, 1.8 mmol) was obtained on cooling the hexane solution to −30° C., separation of the crystals by filtration, washing with hexane and drying under vacuum.

Component (B):

N,N-dimethylanilinium tetrakis(pentafluorophenyl)-borate, $[PhNMe_2H]^+[B(C_6F_5)_4]^−$, (DAN-FABA), was purchased from Asahi Glass Co as very pure compound of melting point, 226.9° C.

Component (C):

Tris(2-methyl-propyl)aluminium (TIBA) was obtained from Witco as pure compound and diluted in hexane to 1 M. In examples 10-15 and 23-24 it was obtained from Alrdrich and used as pure compound.

(2-Methyl-propyl)aluminoxane (TIBAO)

TIBAO was either obtained from Witco as a 30% w/w solution in cyclohexane or prepared immediately prior to use by reacting a solution of TIBA (obtained as reported above) with a half-equivalent of water, whilst maintaining the reaction temperature in the range 5–15° C.

Bis(2,4,4Trimethyl-pentyl)aluminum hydride (DIOAH) was obtained from Akzo-Nobel as a 37.1 wt % heptane solution.

Methylalumoxane (MAO) was purchased from Witco as a 10 wt. % solution in toluene, dried under vacuum to reach a free flowing solid powder and then solved in toluene as 1 M solution before the use.

POLYMERIZATION

Comparative Examples 1–4

7.7 mg of dimethyl-anilinium tetrakispentafluoro-phenyl-borate was weighted in a schlenk tube. Then 10.5 ml of anhydrous toluene containing 0.22 mmol of TIBA (0.22 ml of 1 M hexane solution) was added and the mixture was stirred to a complete solution. 1.7 mg of the bis-amide-$Cl_2$ (compound 1) or dibenzyl (compound 2) was weighted in a second Schlenk tube and then 5 ml of the previously prepared toluene solution were added. The mixture was stirred at room temperature (about 15 min) to form a homogeneous solution. 50 ml of anhydrous toluene (or hexane), containing 0.12 mmol of TIBA, was introduced into a 200 ml glass autoclave purged with ethylene. The reactor was then heated to 45–48° C. and then the catalytic solution was introduced. The autoclave was closed, pressurized with 4 bar of ethylene, thermostated at 50° C. and the final pressure was constant during the course of the experiment At the end, the ethylene flow was stopped, the autoclave cooled to −20° C. and 0.2 ml of iso-propanol was injected. A sample of solution was taken for the GC-analysis, while the rest of the solution was warmed up to room temperature and filtered to separate the solid product by working under nitrogen atmosphere. The solid product was then washed with methanol and dried at 60° C. under vacuum Polymerization data are reported in table 1.

EXAMPLES 5–7

Ethylene Polymerization in a Glass Autoclave

Ethylene polymerization under standard conditions was performed in a 260 ml Buchi glass autoclave, provided with magnetic stirrer, temperature indicator and feeding line for the ethylene. It was purified and fluxed with ethylene at 35° C. 140 ml of heptane were introduced at room temperature. The catalytic system was prepared separately in 10 ml of heptane by dissolving the titanium bisamide (compound 3) with the aluminum alkyl or aluminoxane (reported in table 2) and aged 15 minutes at room temperature. In a second Schlenk a toluene solution of the boron compound (DAN-FABA) was prepared. The proper amount of this solution (see table 2) was added to the titanium solution and stirred at room temperature for 15 minutes before the introduction in the polymerization reactor under ethylene flow. The reactor was closed, the temperature risen to 50° C. and pressurized with ethylene to 5.0 bar-g. The total pressure was kept constant by feeding ethylene. After the time indicated in Table 2, the polymerization was stopped by cooling, by degassing the reactor and by introducing 1 ml of methanol. The polymer was washed with acidic methanol, than with methanol and dried in an oven at 60° C. under vacuum. The polymer characterization is reported in table 2.

Comparative Example 8

The example 6 was repeated by using MAO instead of DAN-FABA. The polymer characterization is reported in table 2.

Comparative Example 9

The example 8 was repeated by using TIBA instead of TIBAO as component B. The polymer characterization is reported in table 2.

EXAMPLE 10

A 1 liter reactor equipped with anchor stirrer, a catalyst injection system and jacket cooling (two Julabo baths) was evacuated overnight at 0.02 bar at 70° C. The temperature was decreased to 50° C. and the reactor was pressurised with $N_2$ (1 bar) then pickled at 50° C. using a mixture of TIBA (0.25 g) and isooctane (150 ml) applying continuous stirring. The pickle mixture was removed and the reactor was charged with 400 ml isooctane whilst setting the temperature at 50° C., subsequently the reactor was pressurized with ethylene (3 bar).

Separately 1.78 g of TIBA (9.00 mmol) was dissolved in 20 g of toluene in a bottle with a septum cap. The solution was cooled to 0–4° C. using an ice bath, and 81 µL of water (4.5 mmol) added in four shots using a 50 µL syringe, whilst maintaining the temperature below 15° C. and purging the solution with nitrogen. Part of the solution (0.3 mmol TIBAO) was introduced into the reactor, applying the injection system, using 20 ml of isooctane. Meanwhile $(Me_2SiNCMe_3)_2TiBz_2$ (10.5 µmol) (compound 4) and DAN-FABA (10.5 µmol) were mixed with 15.71 g of a toluene solution containing TIBAO (0.102 mmol).

Ten minutes after the introduction of the 0.30 mmol of TIBAO into the reactor, 0.778 g (0.50 µmol) of the solution of the activated Ti compound (aged for 20 min) containing TIBAO (0.055 µmol) was injected into the reactor (using 20 ml isooctane). The polymerization was continued for 20 min at a constant temperature (50° C.) and pressure (3 bar of ethylene) using 600 rpm stirring. The polymerization was then stopped by rapidly venting the ethylene and removing the slurry of polyethylene from the reactor. After filtration the polyethylene was dried (70–80° C., 200 mbar, nitrogen purge) and weighed, giving 16.3 g of HDPE, exhibiting the properties given in Table 3.

EXAMPLE 11–13

For the examples 11–13 the procedure of example 10 was utilized, the reaction conditions, polymerization yields and polymer properties are given in Table 3.

EXAMPLE 14

A 5 liter reactor equipped with turbine stirrer, steam/water temperature control and a catalyst injection system was heated to 150–160° C. overnight, whilst purging with nitrogen, cooled and then pickled at 70° C. using a mixture of TIBA (0.25 g), isooctane (20 ml) and propylene (500 g). The pickle mixture was removed and the reactor was charged with 1.8 L isooctane whilst increasing the temperature from 20° C. to 50° C. Subsequently the reactor was pressurised with ethylene (3 bar).

Separately 1.78 g of TIBA (9.00 mmol) was dissolved in 20 g of toluene in a bottle with a septum cap. The solution was cooled to 0–4° C. using an ice bath, and 81 µL of water (4.5 mmol) added in four shots using a 25 µL syringe, whilst maintaining the temperature below 15° C. and purging the solution with nitrogen. Part of the solution (3.0 mmol TIBAO) was introduced into the reactor, applying the injection system, using 20 g of isooctane Meanwhile $(Me_2SiNCMe_3)_2TiBz_2$ (compound 4) (20.5 µmol) and DAN-FABA (20.5 µmol) were mixed with 15.21 g of a toluene solution containing TIBAO (0.195 mmol). Ten minutes after the introduction of the 3.0 mmol of TIBAO into the reactor, 3.0 g of the solution of the activated Ti compound (3.99 µmol), aged for 20 min, was injected into the reactor (using 20 ml isooctane). The polymerization was continued for 25 min at a constant temperature (50° C.) and pressure (3 bar of ethylene) using 840–1100 rpm stirring. The polymerization was then stopped by injection of 5–10 ml methanol. The heating was discontinued and the ethylene rapidly vented and the polyethylene slurry collected. After filtration the polyethylene was dried (70–80° C., 200 mbar, nitrogen purge).

The reaction conditions as well as polymerization yield are shown in Table 4. The polymer characterization is reported in Table 4a.

The higher value of the flow Activation energy Ea, 11.3 Kcal/mole can be attributed to the presence of long chain branching, while usual value for linear HDPE is found to be about 6.5 kcal/mole.

EXAMPLE 15

A 25 liter reactor equipped with turbine stirrer, steam/water temperature control and a catalyst injection system was heated to 150-160° C. overnight, whilst purging with nitrogen, cooled and then pickled at 70° C. using a mixture of TIBA (0.9 g), isooctane (3 L) and ethylene (7 bar). The pickle mixture was removed and the reactor then charged with 16 L isooctane whilst increasing the temperature from 20° C. to 50° C. Subsequently the reactor was pressurised with ethylene (3 bar).

Separately 7.12 g of TIBA (36 mmol) was dissolved in 92.2 g of toluene in a bottle with a septum cap. The solution was cooled to 0-4° C. using an ice bath, and 324 µL of water (18 mmol) added in 7 shots using a 50 µL syringe, whilst maintaining the temperature below 15° C. and purging the solution with nitrogen. Part of the solution (11.6 mmol TIBAO) was introduced into the reactor, applying the injection system, using 20 ml of isooctane.

Meanwhile $(Me_2SiNCMe_3)_2TiBz_2$ (compound 4)(34 µmol) and DAN-FABA (38 µmol) were mixed with 22 g of a toluene solution containing TIBAO (0.280 mmol). Ten minutes after the introduction of the 11.6 mmol of TIBAO into the reactor, the solution of the activated Ti compound (aged 20 min) was injected into the reactor (using 20 ml isooctane).

The polymerization was continued for 62 min at a constant temperature (50° C.) and pressure (3-bar of ethylene) using 500 rpm stirring. The polymerization was stopped by injection of 5–10 ml methanol. The heating was discontinued, the ethylene vented and the polyethylene slurry collected. After filtration the polyethylene was dried (70–80° C., 200 mbar, nitrogen purge).

The reaction condition as well as polymerization yield are shown in Table 4. The polymer characterization is reported in Table 4a

EXAMPLE 16–18

Ethylene/1-hexene Copolymerization

In a 260 ml glass autoclave, provided with magnetic stirrer, temperature indicator and feeding line for ethylene was purified and fluxed with ethylene at 35° C. 1-hexene in the amount reported in Table 5 and heptane to reach 140 ml of volume was introduced at room temperature. The catalytic system was prepared separately in 10 ml of heptane as reported in example 5 and after 15 minutes of stirring the solution was introduced into the autoclave under ethylene flow. The reactor was closed, the temperature risen to 50° C. and pressurized to 5 bar-g. The total pressure was kept constant by feeding ethylene. After 30 minutes the polymerization was stopped by cooling, by degassing the reactor and by introducing 1 ml of methanol. The achieved polymer was washed with acidic methanol, then with methanol and dried in an oven at 60° C. under vacuum. The polymer characterization is reported in table 5.

EXAMPLE 19

The same procedure of example 16 was applied but 1-tetradecene was used instead of 1-hexene. The polymer characterization is reported in table 5.

EXAMPLE 20

The same procedure of example 16 was applied but 5-ethylidene-2-norbornene was used instead of 1-hexene. The polymer characterization is reported in table 5.

Comparative Examples 21–22

The same procedure of example 16 was applied but MAO was used instead of DAN-FABA.
The polymer characterization is reported in table 5.

EXAMPLE 23 ETHYLENE/PROPYLENE COPOLYMER

A 5 liter reactor equipped with turbine stirrer, steam/water temperature control and a catalyst injection system was heated to 150–160° C. overnight, whilst purging with nitrogen, cooled and then pickled at 70° C. using a mixture of TIBA (0.25 g), isooctane (20 ml) and propylene (500 g). The pickle mixture was removed and the reactor then charged with 2 L isooctane whilst increasing the temperature from 20° C. to 50° C. Subsequently the reactor was pressurized with propylene (4.7 bar) and ethylene (9 bar).

TIBAO solution was prepared according to the procedure mentioned in example 10. Part of the solution (3.0 mmol TIBAO) was introduced into the reactor, applying the injection system, using 20 mL of isooctane.

The activated Ti compound was prepared according to the procedure mentioned in example 14. A solution of the activated Ti compound (1.52 micromol, aged 20 min) was injected into the reactor (using 20 ml isooctane). The copolymerization was continued for 27 min using 840–1100 rpm stirring. Constant pressure of 13.7 bar was maintained by addition of ethylene. The polymerization was then stopped by injection of 5–10 ml methanol. The heating was then discontinued and the ethylene/propylene vented and the copolymer slurry collected by filtration. After filtration the copolymer was dried (70–80° C., 200 mbar, nitrogen purge).

The reaction conditions, as well as polymer yields and polymer properties of the obtained polymer, are shown in Table 6.

EXAMPLE 24 ETHYLENE/PROPYLENE COPOLYMER

The same procedure of example 23 was applied but with 12.4 bar propylene and 2.0 bar ethylene pressure

EXAMPLE 25

(Catalyst Supportation)

In 100 ml round bottom flask, equipped with a blad mechanical stirrer, under nitrogen atmosphere, was introduced 4.6 g of polypropylene (spherical particle, Average Particle size 356 μm; porosity 28.6 vol. %) and 46 ml of TIBA/hexane solution (10 wt/vol %). The suspension was stirred one hour at 50° C., then was filtered. A solution prepared in a Shlenck tube by reacting 25.6 mg of the component A of example 3, 2.55 ml of TIBAO (20% wt/vol heptane solution) and 18.3 ml of a toluene solution of DAN-FABA (0.135 mmol) was dropped to the residue, in 60 minutes. The final suspension was stirred for 60 minutes at room temperature and then the solvent evaporated under vacuum. 5.7 g of free flowing particle was obtained.

EXAMPLE 26

Ethylene polymerization under standard conditions was performed in a 260 ml Buchi glass autoclave, provided with magnetic stirrer, temperature indicator and feeding line for the ethylene. It was purified and fluxed with ethylene at 35° C. 140 ml of heptane, containing 0.2 mmol of TIBAO, was introduced at room temperature. 426 mg of the catalytic system of example 25 was slurried in 10 ml of heptane and then introduced in the polymerization reactor under ethylene flow. The reactor was closed, the temperature risen to 50° C. and pressurized with ethylene to 5.0 bar-g. The total pressure was kept constant by feeding ethylene. After 30 minutes, the polymerization was stopped by cooling, by degassing the reactor and by introducing 1 ml of methanol. The obtained polymer was washed with acidic methanol, than with methanol and dried in an oven at 60° C. in vacuum. 2.83 g of spherical polymer particle (23.3 Kg/gTi*h) was obtained. The characterization showed:

I.V., 7.9 dL/g

Tc, 109° C.; Tm(II), 135.2° C.; ΔH, 168 J/g. Chain end analysis: vinyl, 72 mol. %; vinylidene, <1 mol. %; internal double bond, 28 mol. %

EXAMPLE 27

In a 260 ml glass autoclave, provided with magnetic stirrer, temperature indicator and feeding line for ethylene was purified and fluxed with ethylene at 35° C. At room temperature it was introduced 1-hexene (5 ml) and heptane to reach 140 ml of volume. The catalytic system was prepared separately in 10 ml of heptane as reported in example 26 by using 385 mg of the component of example 25. The final slurry was introduced into the autoclave under ethylene flow. The reactor was closed, the temperature risen to 50° C. and pressurized to 5 bar-g. The total pressure was kept constant by feeding ethylene. After 15 minutes the polymerization was stopped by cooling, by degassing the reactor and by introducing 1 ml of methanol. The obtained polymer was washed with acidic methanol, then with methanol and dried in an oven at 60° C. under vacuum. 5.4 g of copolymer (98.5 Kg/gTi*h) was obtained. The characterization showed:

I.V., 1.2 dL/g 1-hexene content, 2.4 mol. %

Tc, 103° C.; Tm(II), 118.2° C.; ΔH, 115 J/g; (a second peak due to the support at 159° C. was observed). Chain end analysis: vinyl, 9 mol. %; vinylidene, 1 mol. %; internal double bond, 90 mol. %

TABLE 1

| Example | Amide | mg | solvent | PE g | oligomers g | Acitivity[£] Kg/gZr/h | oligomers distribution[#] |
|---|---|---|---|---|---|---|---|
| 1 | (1) | 2.9 | hexane | 0.1 | 8.1 | 13 | $C_4$–$C_{26}$ |
| 2 | (1) | 1.7 | toluene | 0.6[§] | 29.9[§] | 110 | $C_4$–$C_{28}$ |
| 3 | (2) | 1.8 | hexane | 0.4 | 47.7 | 156 | $C_4$–$C_{32}$ |
| 4 | (2) | 3.1 | toluene | 0.8 | 49.8 | 95 | $C_4$–$C_{32}$ |

Other Polymerization conditions: 200 ml glass autoclave; solvent, 50 ml; TIBA, 0.3 mmol, Al/Zr = 50 molar ratio; B/Zr = 1.1 molar ratio; aged 15 min; ethylene partial pressure, 4 bar; temperature, 50° C.; polymerization time, 60 min.
[£]total activity
[#]From G.C. analysis,
[§]In 45 min. of polymerization

TABLE 2

| | Component | | | | | Polymer | | | DSC | | | $^{13}$C NMR | $^1$H NMR | int. |
|---|---|---|---|---|---|---|---|---|---|---|---|---|---|---|
| Ex. | A mg | B Type | B mmol | B/A mol/mol | C type | C/A mol/mol | time min | yield g | activity Kg/$g_n$*h | I.V. dl/g | Tc ° C. | Tm ° C. | ΔH J/g | LCB/1000C | vinyl % | doub.bond % |
| 5 | 1.0 | DAN-FABA | 1.32 | 2 | TIBA | 498 | 60 | 2.36 | 18.6 | 0.9 | | | | | | |
| 6 | 0.5 | DAN-FABA | 0.67 | 2 | TIBAO | 506 | 15 | 2.84 | 179.1 | 1.3 | 114.2 | 136.1 | 193 | 0.30 | 85 | 15 |
| 7 | 0.8 | DAN-FABA | 1.10 | 2 | DIOAH | 519 | 30 | 0.96 | 18.9 | 5.2 | | | | | | |
| 8* | 0.5 | MAO | 0.67 | 1019 | TIBAO | 506 | 60 | 0.82 | 12.9 | 3.8 | | | | | | |
| 9* | 1.0 | MAO | 1.33 | 1019 | TIBA | 502 | 60 | 2.27 | 17.9 | 2.5 | 112 | 136.4 | 211 | <0.03 | 73 | 27 |

Other Polymerization conditions: 260 ml glass autoclave; solvent, heptane 150 ml; ethylene partial pressure, 4 bar; temperature, 50° C.;
*comparative

TABLE 3

| Ex | [Ti]Bz₂ micromol | DAN-FABA micromol | TIBAO premix mmol | TIBAO autoclave mmol | Temp. ° C. | time min | p$C_2^=$ bar | Polymer Yield g | Rate Ton/gTi.h | DSC Tm (° C.) | DSC ΔH J/g | GPC Mn | GPC Mw | GPC Mw/Mn | $^1$H-NMR Vinyl % | $^1$H-NMR Internal % | $^{13}$C-NMR LCB/1000 C |
|---|---|---|---|---|---|---|---|---|---|---|---|---|---|---|---|---|---|
| 10 | 0.50 | 0.50 | 0.055 | 0.298 | 50 | 20 | 3.0 | 16.3 | 2.05 | 139.4 | 200.6 | 24300 | 59000 | 2.5 | 83 | 17 | 0.4 |
| 11 | 0.50 | 0.53 | 0.048 | 0.304 | 30 | 20 | 3.0 | 15 | 1.88 | — | — | 26500 | 65100 | 2.4 | | | |
| 12 | 0.52 | 0.59 | 0.053 | 0.311 | 70 | 20 | 3.0 | 9.6 | 1.16 | 139.9 | 200 | 21200 | 59700 | 2.8 | 78 | 22 | 0.40 |
| 13 | 0.50 | 0.53 | 0.046 | 0.303 | 50 | 20 | 6.0 | 16.8 | 2.10 | — | — | 21200 | 47600 | 2.2 | | | |

TABLE 4

| Ex | [Ti]Bz₂ micromol | DAN-FABA micromol | TIBAO premix mmol | TIBAO autoclave mmol | Iso-octane L | Temp ° C. | time min | p$C_2^=$ bar | Polymer Yield g | Polymer Activity Ton/gTi.h |
|---|---|---|---|---|---|---|---|---|---|---|
| 14 | 3.99 | 3.99 | 0.038 | 3.04 | 1.8 | 50 | 25 | 3.0 | 64 | 0.80 |
| 15 | 33.8 | 37.9 | 0.280 | 11.6 | 16 | 50 | 62 | 3.0 | 300 | 0.18 |

TABLE 4a

| | DSC | | | GPC | | | | NMR (per chain) | | | | | | |
|---|---|---|---|---|---|---|---|---|---|---|---|---|---|---|
| Ex | Tc ° C. | Tm ° C. | ΔH J/g | I.V. dl/g | Mn | Mw | Mw/Mn | Vinyl % | Internal % | LCB/1000 C | MI E g/10' | MI F g/10' | F/E | Density g/cm³ |
| 14 | 112 | 134 | 199 | 1.06 | 17200 | 61000 | 3.5 | 74 | 26 | 0.3 | 0.54 | 31.6 | 58.4 | 0.9549 |
| 15 | 112 | 134.5 | 212 | 1.16 | 23600 | 59900 | 2.5 | 73 | 27 | 0.4 | 0.41 | 26.2 | 63.7 | 0.9588 |

TABLE 5

| | Component | | | | | | | | Polymer | | | Comon. | DSC | | | ¹H NMR | | |
|---|---|---|---|---|---|---|---|---|---|---|---|---|---|---|---|---|---|---|
| | | C | C/A | | B/A | | | | activity | | | | | | | vinyl | vinylid. | inter. double |
| | A | | mol/ | B | mol/ | 1-olefin | | Temp | yield | Kg/ | I.V. | mol. | Tc | Tm | □H | mol. | mol. | bond |
| Ex. | mg | type | mmol | mol | type | mol | type | ml | °C. | g | g$_n$*h | dl/g | % | °C. | °C. | J/g | % | % | mol. % |
| 16 | 0.8 | TIBAO | 1.07 | 505 | DAN-FABA | 2 | 1-C$_6$- | 15 | 60 | 6.53 | 128.7 | 0.4 | 3.0 | 99.3 | 111.4 | 156 | 7.5 | 0.0 | 92.5 |
| 17 | 0.8 | TIBAO | 1.07 | 505 | DAN-FABA | 2 | 1-C$_6$- | 5 | 70 | 10.9 | 214.2 | 0.3 | | 106.9 | 118.9 | 167 | 10.0 | 0.0 | 90.0 |
| 18 | 0.8 | TIBAO | 1.07 | 505 | DAN-FABA | 2 | 1-C$_6$- | 5 | 50 | 3.5 | 69.0 | 0.2 | 2.5 | 108.1 | 120.5 | 170 | 12.2 | 0.0 | 87.8 |
| 19 | 0.8 | TIBAO | 1.07 | 505 | DAN-FABA | 2 | 1-C$_{14}$- | 5* | 50 | 3.22* | 63.4 | 0.5 | 1.2 | 111.6 | 123.6 | 177 | 15.6 | 0.0 | 84.4 |
| 20 | 0.8 | TIBAO | 1.07 | 505 | DAN-FABA | 2 | ENB | 2.66* | 60 | 12.3* | 241.4 | 0.8 | 3.8 | 97.5 | 118.5 | 107 | | | |
| 21§ | 1 | TIBA | 0.66 | 249 | MAO | 1019 | 1-C$_6$- | 5 | 50 | 1.42 | 22.4 | 1.0 | 2.4 | 102.1 | 121.3 | 144 | 5.6 | 0.7 | 93.6 |
| 22§ | 1 | TIBA | 0.66 | 249 | MAO | 1019 | 1-C$_6$- | 5 | 73 | 1.53 | 24.1 | 0.3 | 2.8 | 102.5 | 114.8/102 | 149 | 8.1 | 0.0 | 91.9 |

Other Polymerization conditions: 260 ml glass autoclave; solvent, heptane to 150 ml as final volume; Polym. time, 30 min.; Ethylene final pressure 5 bar-g. the polymer was purified from the unreacted 1-olefin by Kumagawa extraction with acetone.
§comparative; ENB = 5-Ethtylidene-2-norbornene.

TABLE 6

| Ex | [Ti]Bz$_2$ micromol | DAN-FABA micromol | TIBAO premix mmol | TIBAO autoclave mmol | Isooctane ml | time min | Temp. °C. | pC$_2$= bar | pC$_3$= bar | Polymer Yield g | Activity Ton/gTi.h | Comon pC$_3$= mol % | DSC Tm °C. | ΔH J/g | GPC Mw | Mn | Mw/Mn |
|---|---|---|---|---|---|---|---|---|---|---|---|---|---|---|---|---|---|
| 23 | 1.53 | 1.52 | 0.015 | 3.000 | 2 | 27 | 50 | 9.0 | 4.7 | 57 | 1.73 | 3.5 | 118.7 | 155.2 | 14600 | 6115 | 2.4 |
| 24 | 1.50 | 1.49 | 0.015 | 3.030 | 2 | 24 | 50 | 2.0 | 12.4 | 120 | 4.18 | 14.1 | n.d. | n.d. | 4760 | 1750 | 2.7 |

The invention claimed is:

1. A process for homopolymerizing ethylene comprising contacting under polymerization conditions, ethylene with a catalyst system obtained by contacting:

A) a bis amido compound of formula (I)

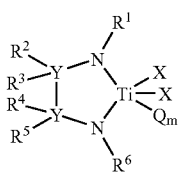

(I)

wherein
Ti is titanium;
N is a trivalent nitrogen atom;
Y is equal to or different from each other, and is selected from the group consisting of Si, Ge and Sn;
X is equal to or different from each other, and is selected from the group consisting of hydrogen, halogen, linear or branched, saturated or unsaturated $C_1$–$C_{20}$ alkyl, $C_1$–$C_{20}$ alkoxyl, $C_3$–$C_{20}$ cycloalkyl, $C_6$–$C_{20}$ aryl, $C_6$–$C_{20}$ aryloxyl, $C_7$–$C_{20}$ alkylaryl and $C_7$–$C_{20}$ arylalkyl radicals, optionally containing one or more Si, Ge, O, S, P, B or N atoms, or X forms a ring having from 4 to 8 members;
$R^1$, $R^2$, $R^3$, $R^4$, $R^5$ and $R^6$ are equal to or different from each other, and are selected from the group consisting of hydrogen, Si($R^7$)$_3$, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more Si, Ge, O, S, P, B or N atoms, or two or four substituents selected from the group consisting of $R^1$, $R^2$, $R^3$, $R^4$, $R^5$ and $R^6$ are linked to two vicinal atoms and form one or two rings having from 4 to 8 members;
$R^7$ are equal to or different from each other, and are linear or branched, saturated or unsaturated $C_1$–$C_{10}$ alkyl, $C_3$–$C_{10}$ cycloalkyl, $C_6$–$C_{15}$ aryl, $C_7$–$C_{15}$ alkylaryl or $C_7$–$C_{15}$ arylalkyl radicals;
Q is a neutral Lewis base; and
m is an integer ranging from 0 to 2;
the bis-amido compound optionally being present in a dimer form;
B) one or more activating cocatalysts selected from
i) compounds of formula U$^+$Z$^-$, wherein U$^+$is a cation that reacts irreversibly with X, and Z$^-$ is a compatible non-coordinating anion comprising at least one boron atom; and
ii) neutral, strongly Lewis acidic compounds comprising at least one boron atom or combinations thereof;
C) optionally when X is halogen, one or more aluminum alkyls or alumoxanes,
wherein the process produces an ethylene homopolymer with a long chain branch content higher than 0.05 per 1000 carbon atoms.

2. The process according to claim 1, wherein the bis amido compound is present in a dimer form of formula (II)

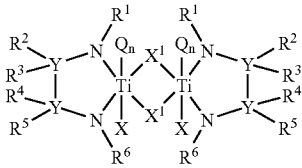

(II)

wherein $X^1$ is a divalent radical selected from the group consisting of linear or branched, saturated or unsaturated $C_1$–$C_{20}$ alkylidene, $C_3$–$C_{20}$ cycloalkylidene, $C_6$–$C_{20}$ arylidene, $C_7$–$C_{20}$ alkylarylidene and $C_7$–$C_{20}$ arylalkyldene radicals, optionally containing one or more Si, Ge, O, S, P, B or N atoms, and n is 0 or 1.

3. The process according to claim 1, or 2, wherein Y is Si.

4. The process according to claim 1, or 2, wherein X is selected from hydrogen, halogen, methyl, ethyl, propyl, n-butyl, phenyl, 4-alkyl-phenyl or benzyl, or X can form together with the titanium atom a ring having from 4 to 8 members.

5. The process according to claim 1, or 2, wherein $R^1$, $R^2$, $R^3$, $R^4$, $R^5$ and $R^6$ are equal to or different from each other, and are methyl, ethyl, propyl, n-butyl, t-butyl, t-amyl, cyclohexyl, phenyl, dimethyl-phenyl, diisopropyl-phenyl, trimethylsilyl, tri-t-butyl-silyl, phenylmethyl-ethyl, diphenyl-ethyl or triphenyl-methyl.

6. The process according to claim 1, wherein $U^{30}$ is a metal cation or a quaternary ammonium cation of formula $N(R^{10})_3H^+$;

$R^{10}$ is equal to or different from each other, and is selected from the group consisting of linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more Si, Ge, O, S, P, or B atom;

$Z^-$ is a borate of formula $[B(R^8)_4]^-$;

$R^8$ is selected from the group consisting of hydrogen, $C_1$–$C_{10}$ alkyl, $C_3$–$C_{10}$ cycloalkyl, $C_6$–$C_{15}$ aryl, $C_7$–$C_{15}$ alkylaryl and $C_7$–$C_{15}$ arylalkyl radicals, optionally substituted with one or more halogens;

or the activating cocatalyst $U^+Z^-$ is a zwitterionic compound of formula $(R^8)_3BP$; and P is a substituted or unsubstituted pyrrole.

7. The process according to claim 6, wherein $U^+$ is tri-n-butylammonium or dimethylanilinium, and $Z^-$ is selected from the group consisting of $[B(C_6F_5)_4]^-$, $[R^8B(C_6F_5)_3]^-$, $[B(FC_6H_4)_4]^-$, $[R^8B(FC_6H_4)_3]^-$, $[B\{(CF_3)_2(C_6H_3)\}_4]^-$ and $[R^8B\{(CF_3)_2(C_6H_3)\}_3]^-$.

8. The process according to claim 1, wherein the activating cocatalyst is a neutral, strongly Lewis acidic compound of formula $(R^8)_3B$;

$R^8$ is selected from the group consisting of hydrogen, $C_1$–$C_{10}$ alkyl, $C_3$–$C_{10}$ cycloalkyl, $C_6$–$C_{15}$ aryl, $C_7$–$C_{15}$ alkylaryl and $C_7$–$C_{15}$ arylalkyl radicals, optionally substituted with one or more halogens;

or the activating cocatalyst $U^+Z^-$ is a zwitterionic compound of formula $(R^8)_3BP$; and P is a substituted or unsubstituted pyrrole.

9. The process according to claim 1, wherein (C) is one or more aluminum alkyls of formula $H_xAlR^9_{3-x}$ or $H_yAl_2R^9_{6-y}$ wherein x and y are numbers ranging from 0 to 1, both x and y can be non-integer numbers, and $R^9$ is selected from the group consisting of hydrogen, halogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals.

10. The process according to claim 1, wherein (C) is one or more alumoxanes.

11. The process according to claim 1, wherein (A), (B) and (C), either singularly or in mixture are deposited on an inert support.

* * * * *

UNITED STATES PATENT AND TRADEMARK OFFICE
CERTIFICATE OF CORRECTION

PATENT NO. : 7,202,315 B2
APPLICATION NO. : 10/381401
DATED : April 10, 2007
INVENTOR(S) : Tiziano Dall'Occo et al.

It is certified that error appears in the above-identified patent and that said Letters Patent is hereby corrected as shown below:

At col. 23, line 30, delete "$U^{30}$" insert instead --$U^+$--

At col. 24, lines 12 & 13, delete "$[B\{(CF_3)_2C_6II_3)\}_4]^-$" insert instead --$[B\{(CF_3)_2C_6H_3)\}_4]^-$--

At col. 24, line 13, delete "$[R^8B\{(CF_3)_2C_6II_3)\}_3]^-$" insert instead --$[R^8B\{(CF_3)_2C_6H_3)\}_3]^-$--

Signed and Sealed this

Sixteenth Day of December, 2008

JON W. DUDAS
*Director of the United States Patent and Trademark Office*